April 7, 1953  J. M. SCHENK  2,633,776
METHOD OF MANUFACTURING TURBINE BLADES
INTEGRAL WITH TURBINE ROTOR
Filed Aug. 14, 1948  2 SHEETS—SHEET 1
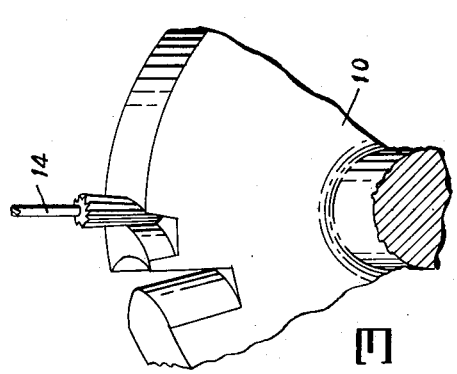
Fig. 3
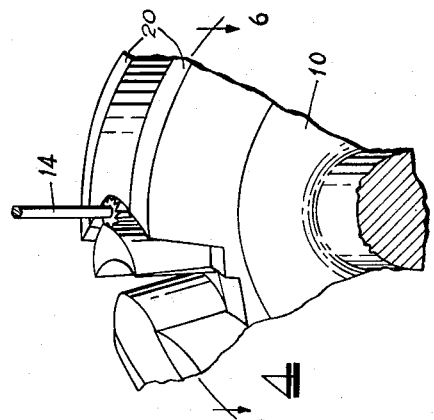
Fig. 4
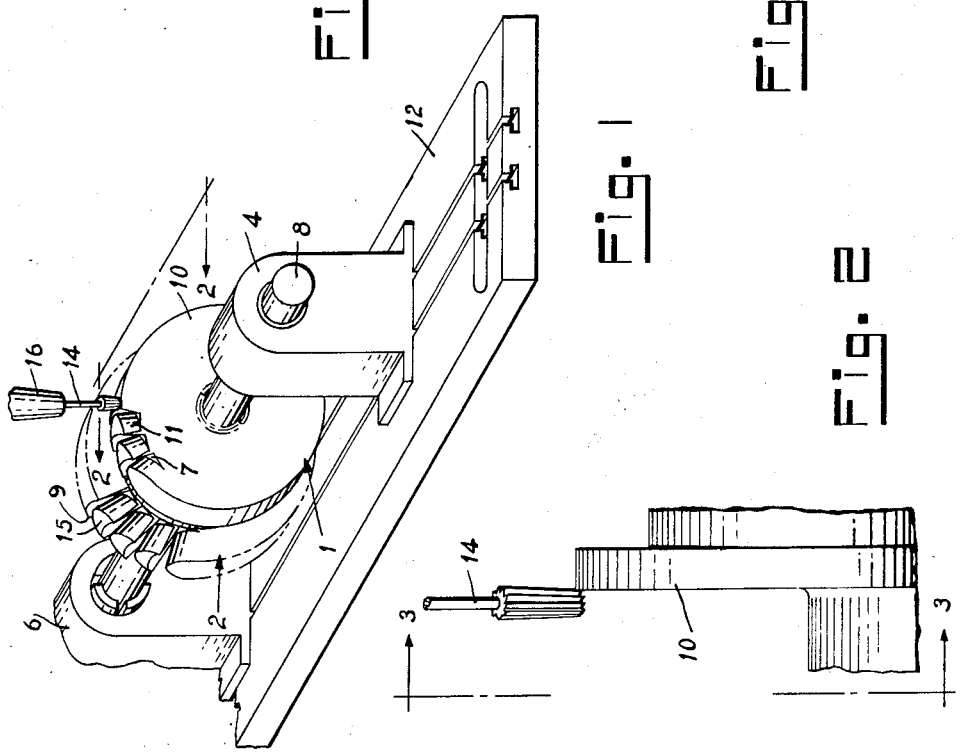
Fig. 1
Fig. 2
INVENTOR.
JAN M. SCHENK
BY
Virgil F. Davrio
ATTORNEY April 7, 1953  
J. M. SCHENK  
2,633,776  
METHOD OF MANUFACTURING TURBINE BLADES
INTEGRAL WITH TURBINE ROTOR
Filed Aug. 14, 1948
2 SHEETS—SHEET 2
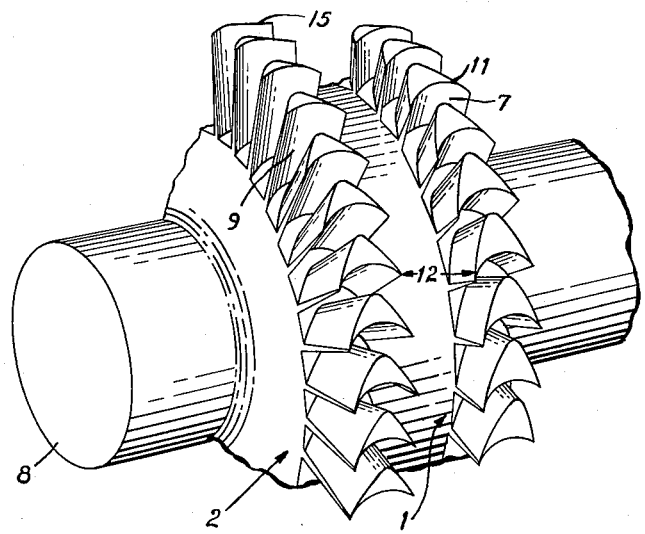
Fig. 5
Fig. 6
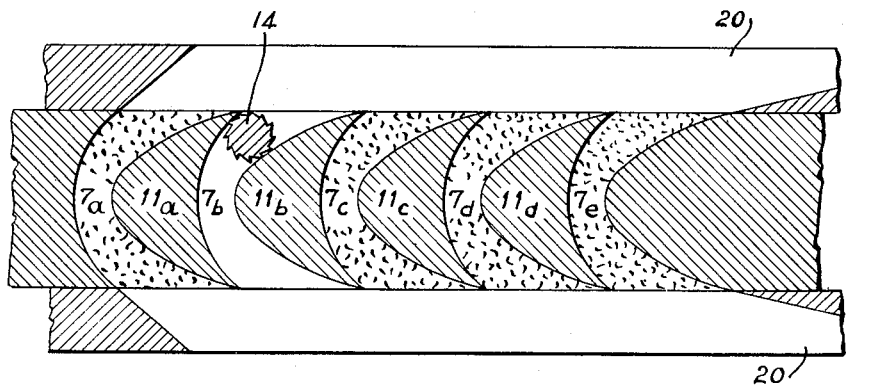
INVENTOR.
JAN M. SCHENK
BY
Virgil F. Davrio
ATTORNEY Patented Apr. 7, 1953

2,633,776

UNITED STATES PATENT OFFICE 2,633,776

METHOD OF MANUFACTURING TURBINE BLADES INTEGRAL WITH TURBINE ROTOR

Jan M. Schenk, Glen Ridge, N. J., assignor to The M. W. Kellogg Co., Jersey City, N. J., a corporation of Delaware Application August 14, 1948, Serial No. 44,266

9 Claims. (Cl. 90—11)

1

This invention relates to a method of machining and more particularly to a method of machining a turbine rotor to provide a rotor with a plurality of blades integrally formed thereon.

It is a primary object to the present invention to provide a novel machining method for producing turbine blades integral with a turbine rotor.

Another object of the present invention is to provide a novel machining method wherein a tapered milling cutter is employed to cut a plurality of grooves in a turbine rotor and whereby two adjacent grooves define a turbine blade integral with the turbine rotor.

Another object of the present invention is to provide a novel machining method wherein a tapered milling cutter is employed to cut a groove transversely curved across the thickness of a turbine rotor to form an elastic fluid passage whose cross-section, as taken in a plane perpendicular to the path of the cutter, is constant and substantially identical to the cross-section of the cutter, as taken in a corresponding plane through the longitudinal axis of the cutter, with the area of the passage taken in a plane parallel to the sides of the rotor a minimum at the center and a maximum at the outer faces of the rotor blank.

Another object of the present invention is to provide a novel machining method wherein a tapered milling cutter is employed to cut a transversely curved groove across the thickness of the rotor and wherein each groove may be formed by a plurality of cuts in a progressive manner whereby said cutter in each successive cut removes material from all previously machined surfaces and whereby the last cut determines the shape and finish of the groove.

Another object of the present invention is to provide a novel machining method for producing a plurality of integral and substantially radial projections on a turbine rotor separated by an elastic fluid channel whereby any predetermined shape channel may be cut and whereby two adjacent channels determine an integral and radial projection or turbine blade.

Another object of the present invention is to provide a novel machining method of producing a plurality of substantially radially disposed turbine blades integral with a turbine rotor by means of a formed milling cutter cutting on sub-

2 stantially radial lines of the turbine rotor to form the elastic fluid passages of the turbine rotor which determine the blade contours whereby all the surfaces defining the elastic fluid passages are cut simultaneously and in one cut.

Still another object of the present invention is to provide a novel machining method for producing a multi-stage turbine rotor whereby a plurality of elastic fluid passages are cut in the turbine rotor to define a plurality of stages and a plurality of integral blades thereon.

These and other objects, features and advantages of the present invention will be apparent from the following description, claims, and the following drawings in which:

Fig. 1 illustrates a rotor of a two-stage turbine on which the first stage of blading has been cut and the second stage in the process of being cut.

Fig. 2 illustrates a section of a turbine rotor which is to be machined in a stepwise manner and a milling cutter immediately prior to the start of the first cut.

Fig. 3 is a view similar to Fig. 2 but showing the first cut partially completed.

Fig. 4 is a view similar to Figs. 2 and 3 but showing the last or finish cut being made.

Fig. 5 illustrates a section of a finished turbine rotor on which two stages of blading have been machined by the method of the present invention.

Fig. 6 is a section taken along line 6—6 of Fig. 4 and illustrates a turbine rotor with backing strips and packing in the grooves which have been cut.

While a preferred form of the invention will be described it should be understood that the method set forth is of general application and may be used whenever it is desired to cut a plurality of grooves either symmetrical or unsymmetrical with respect to a plane mutually parallel and centrally located with respect to the sides of the rotor to define a plurality of integral and substantially radial projections.

A turbine rotor blank 10, integral with the shaft 8, which has been cast, forged, or machined from the solid, and finish machined except for the blades, is mounted with one end of shaft 8 in a support 4 and the other end in an index head 6. Support 4 and index head 6 are in turn fixedly mounted to a milling machine table 12. A tapered milling cutter 14 having the general shape of a truncated cone with the smaller of its two parallel sides nearest the rotor blank 10 is mounted in a spindle 16 of the same milling machine by means of a collet, chuck, or the like, for rotation about its longitudinal axis which is generally radial to the rotor blank 10. Cutter 14 is rotated about its longitudinal axis and lowered relative to the rotor blank 10 to the desired full depth of cut. Relative motion is then effected between rotor blank 10 and cutter 14 to cause cutter 14 to move across rotor blank 10 in a curved path to cut a generally radial, transversely curved groove 7 across the thickness of the turbine rotor 10. Throughout the cutting action the axis of rotation of cutter 14 remains normal to the horizontal plane passing through the longitudinal axis of blank 10.

After one groove is completed, rotor blank 10 is then rotated through a predetermined angle by means of indexing means 6 and a second groove 7 is cut in the above described manner. Succeeding grooves are cut in a like manner until the periphery of blank 10 is filled with evenly spaced grooves. The grooves thus formed comprise elastic fluid passages 7 through which the turbine motive fluid will pass when the rotor is completed and assembled in the turbine, and the material of the rotor blank 10 remaining between the grooves 7 comprises turbine blades 11 against which the fluid reacts to impart rotation to the rotor. Inasmuch as cutter 14 cuts both walls of groove 7 as it passes through blank 10, the length of said cutter 14 and its angle of taper are carefully selected so that the fluid passage 7 cut thereby has the desired cross-sectional area throughout its entire depth. Also inasmuch as one side of the groove defines one face of a turbine blade and the other side defines the opposite face of an adjoining blade, the above mentioned relative movement between blank 10 and the axis of rotation of cutter 14 must be such that cutter 14 passes through the blank 10 along a path suitable for a turbine rotor elastic fluid passage. Obviously, the exact path followed by the cutter 14 as it traverses blank 10 will differ depending upon the particular use to which the rotor is to be put, and the type of motive fluid which will drive it. However, it will be apparent to those skilled in the art that any desired relative motion can be obtained by old and well known methods.

The angles through which rotor blank 10 is indexed to cut each succeeding groove must include an arc at the periphery of blank 10 sufficient to include the maximum width of the groove of cutter 14 and the thickness of one turbine blade, so as to allow for machining of an integral number of blades and channels on the periphery of the blank.

If it is not possible to cut the full groove 7 with one pass of cutter 14, as is the case when the material of rotor blank 10 is very hard or tough and the groove to be cut very deep, the method of the present invention employing a conical cutter may be used in cutting the grooves in a stepwise or progressive manner. In cutting a deep groove by means of a plurality of passes the above described method of cutting a groove is employed to cut a relatively shallow groove as shown in Figs. 2 and 3. Following this, cutter 14 is returned to its starting point and is lowered a predetermined amount to make possible the removal of more material from blank 10, and the above described relative motion repeated with the axis of rotation of cutter 14 following the same path with respect to blank 10 that it followed to make the first cut. This process is repeated until the full depth of groove 7 is obtained. It will be apparent to those skilled in the art that when this stepwise or progressive method of machining is employed, using a tapered cutter, each succeeding cut will remove material from all three surfaces defining the groove. Thus there will never be a break or irregularity in any of the surfaces of the groove due to poor tool alignment and it also makes it possible to cut all of the steps except the last, rapidly and without regard to finish, inasmuch as it is possible in the last cut to correct any minor machining errors made in preceding cuts, and also impart the desired finish to the groove. Obviously as many stepwise cuts as are necessary or desired can be made.

The method of the present invention is ideally suited for the machining of turbine rotors having a plurality of stages. The separation or space 12 between stages 1 and 2 Fig. 5 is sufficient to permit the cutter 14 to enter or leave one stage, say stage 1, without damaging the blank or blades of stage 2. For the purpose of clarity the blades and channels have been designated by the numerals 11 and 7 in stage 1, 15 and 9 in stage 2 respectively.

In machining rotors in the above described manner it was found that in some instances due to the material of rotor blank 10 and/or the angles that the groove made with the side of the blank, the thin knife-like edges of the blades rolled over or bent as they were being formed due to the pressure of the cutter 14 forming the next succeeding groove. This tendency of the edges of the blade to bend or roll over can be prevented by clamping thin backing strips 20, of a material softer than the material of the rotor blank 10, to each side of the rotor blank 10 before it is machined. Fig. 6 is a sectional view of a partly machined rotor 10 and shows a pair of backing strips 20 in position on the rotor blank 10.

In machining a turbine rotor by the method of the present invention certain precautions were found to be necessary particularly in regard to the sequence in which the passages are machined. The five adjacent passages 7a, 7b, 7c, 7d and 7e are illustrated in Fig. 6 and form blades 11a, 11b, 11c and 11d respectively which are essentially blades 7 and channels 11 respectively of stage 1. Assuming passage 7b to have been completed and 7a in the process of being milled by the method of the present invention the thin edges of blade 11a will tend to bend or roll over under pressure from the cutter into passage 7b as previously stated. If passage 7c were being cut instead then the thin edge of blade 11b would be forced out beyond the width of the rotor. It was found that this could be prevented by clamping narrow backing strips 20 to each side of the wheel, as illustrated, the ends of which are milled away with the passage. Satisfactory results were obtained by using such strips not only in the sequence 7a, 7b, and 7c but also for the reverse sequence 7c, 7b, 7a. If the passages upon completion are filled with a hard wax, paraffin, or deformation resistant material an alternate method is presented which would permit milling every second passage of the entire circumference and filling the passages machined with a hard wax, paraffin, or deformation resistant material and then returning to cut the alternate blades which were not cut in the first machining operation. In this way the material adjacent the first cut passages will have had sufficient time to cool and the heat generated and the pressure produced by the cutting of one passage will not carry over to the adjacent passage to cause imperfections in the blades. The form of the blades and passages of Figs. 5 and 6 while somewhat exaggerated, approximates the true form of said blades and passages. The exaggerated effect is probably greatest in Fig. 6 as this figure is a view on the arc 6—6 of Fig. 4, while it is to be noted that the cutter 14 moves along a cord of the blank 10.

Since numerous changes may be made in the above described method and different embodiments of the present invention made without departing far from the spirit and scope thereof it is intended that all the matter contained in the foregoing description or shown in the accompanying drawings shall be interpreted as illustrative and not in a limiting sense.

What is claimed is:

1. The method of machining a blank for a turbine rotor, comprising the steps of holding said blank against turning, revolving a milling cutter about its axis of rotation, setting said cutter with said axis substantially normal to the horizontal plane through the longitudinal axis of said blank, opposite a predetermined point on the peripheral face of said blank at the desired full depth of cut relative thereto, effecting relative translational motion between said blank and said cutter to form a groove transversely curved across said face of said blank and symmetrical with the medial plane of said blank, said predetermined point having been selected so that said axis of rotation will be substantially radial in the groove at said medial plane, turning said blank through a predetermined angle about its longitudinal axis and forming a second groove substantially identical to and spaced from the first mentioned groove, to define a generally radial, integral projection comprising a turbine blade.

2. The method of machining a blank for a turbine rotor as set forth in claim 1 wherein the several steps are repeated until the predetermined number of grooves have been formed to define a plurality of generally radial, integral projections comprising said turbine rotor.

3. In the method of machining a blank as set forth in claim 1, wherein said blank is to provide a turbine rotor with a plurality of stages, the repeating of said steps for forming grooves until the predetermined number of grooves have been cut to define a plurality of generally radial, integrally formed projections comprising turbine blades on each of said plurality of stages.

4. In the method of machining a blank for a turbine rotor as set forth in claim 1, the additional steps of securing, adjacent the edges of said peripheral face, backing strips of material softer than the material of said blank, and cutting a tranversely curved groove across a first backing strip, said peripheral face of said blank and a second backing strip, said groove being symmetrical with the medial plane of said blank.

5. In the method of machining a blank for a turbine rotor as set forth in claim 1, the additional step of packing said first mentioned groove with a deformation resistant material prior to rotating said blank and cutting a substantially identical second groove.

6. In a method of machining a blank to provide a turbine rotor having a plurality of generally radial blades integrally formed thereon, the steps comprising holding said blank against turning, revolving a tapered milling cutter about its axis of rotation, said axis being substantially normal to the horizontal plane through the longitudinal axis of said blank, securing a backing strip of material softer than the material of said blank to each of the sides of said blank adjacent the peripheral face thereof, setting said cutter at a predetermined point adjacent said face and at the desired full depth of cut relative thereto, effecting relative translational motion between said blank and backing strip assembly and said cutter to cut a groove transversely curved across a first backing strip, said face of said blank, and a second backing strip, said groove being symmetrical with a plane medially located with respect to the sides of said blank, said predetermined point having been chosen so that said axis of rotation is radial at the juncture of the medial plane with said groove, packing said groove with a deformation resistant material, turning said blank through a predetermined angle about its longitudinal axis and cutting a second groove substantially identical to the first mentioned groove and at the same depth as said first mentioned groove through said blank and backing strip assembly to form an integral and generally radial projection comprising a turbine blade.

7. In a method of machining a blank to provide a turbine rotor with a plurality of generally radial, integrally formed blades thereon, the steps of cutting, at the same time, both sides of the grooves defining said plurality of blades, comprising: holding said blank against turning, revolving a milling cutter about its axis of rotation, said axis of rotation being substantially normal to the horizontal plane through the longitudinal axis of said blank, setting said cutter to a depth of cut less than the desired full depth of cut at a predetermined starting point adjacent an edge of said blank selected to have said axis of rotation radial at the medial plane of said blank, effecting relative translational motion between said blank and said cutter to cause said cutter to cut a groove transversely curved across the face of said blank, said groove being symmetrical with the plane parallel to and centrally located between the sides of said blank, returning said cutter to said predetermined starting point, setting said cutter to a depth of cut greater than the first mentioned depth of cut, effecting the same said relative translational motion to cut said groove deeper and wider whereby material is removed from all previously cut surfaces of said groove to render said groove deeper and wider, and repeating said steps until the desired full depth of cut has been made.

8. In the method of machining a blank as set forth in claim 7 the additional steps of turning said blank through a predetermined angle about its longitudinal axis and cutting a second groove in the same manner identical to and spaced from the first mentioned groove to define an integral and generally radial projection comprising a turbine blade.

9. In the method of machining a blank as set forth in claim 7 the additional steps of turning said blank through a predetermined angle about its longitudinal axis and cutting in the same manner, a second groove identical to and spaced from the completed first mentioned groove, to define an integral and generally radial projection comprising a turbine blade, repeating the several steps for cutting grooves until a predetermined number of grooves have been cut to define a plurality of generally radial, integral projections comprising said plurality of blades of said turbine rotor.

JAN M. SCHENK.

REFERENCES CITED

The following references are of record in the file of this patent:

UNITED STATES PATENTS

| Number | Name | Date |
|---|---|---|
| 767,367 | Westinghouse | Aug. 9, 1904 |
| 1,006,279 | Riddell | Oct. 17, 1911 |
| 1,280,893 | Steenstrup | Oct. 8, 1918 |
| 1,332,445 | Mershon | Mar. 2, 1920 |
| 1,486,771 | Ljungstrom | Mar. 11, 1924 |
| 1,551,342 | Steenstrup | Aug. 25, 1925 |
| 1,670,413 | Kneidl | May 22, 1928 |
| 1,744,757 | Ferguson | Jan. 28, 1930 |
| 2,215,171 | Chalupa | Sept. 17, 1940 |
| 2,269,200 | Hillner | Jan. 6, 1942 |
| 2,429,324 | Meisser | Oct. 21, 1947 |
| 2,431,604 | Birmann | Nov. 25, 1947 |
| 2,480,807 | De Vlieg | Aug. 30, 1949 |